US012662251B2

(12) United States Patent
Peck

(10) Patent No.: US 12,662,251 B2
(45) Date of Patent: Jun. 23, 2026

(54) ELECTRIC AIRCRAFT

(71) Applicant: Vertical Aerospace Group Ltd, Bristol (GB)

(72) Inventor: James Edwin Peck, Bristol (GB)

(73) Assignee: Vertical Aerospace Group Ltd, Bristol (GB)

( * ) Notice: Subject to any disclaimer, the term of this patent is extended or adjusted under 35 U.S.C. 154(b) by 0 days.

(21) Appl. No.: 19/064,551

(22) Filed: Feb. 26, 2025

(65) Prior Publication Data

US 2025/0269972 A1 Aug. 28, 2025

(30) Foreign Application Priority Data

Feb. 28, 2024 (GB) ...................................... 2402828

(51) Int. Cl.
| | |
|---|---|
| *B64D 27/34* | (2024.01) |
| *B64C 29/00* | (2006.01) |
| *B64D 27/32* | (2024.01) |
| *B64D 27/357* | (2024.01) |

(52) U.S. Cl.
CPC .............. *B64D 27/34* (2024.01); *B64C 29/00* (2013.01); *B64D 27/32* (2024.01); *B64D 27/357* (2024.01)

(58) Field of Classification Search
CPC ...... B64D 27/34; B64D 27/32; B64D 27/357; B64D 27/02; B64C 29/00
See application file for complete search history.

(56) References Cited

U.S. PATENT DOCUMENTS

| | | | |
|---|---|---|---|
| 10,559,792 B1 | 2/2020 | Combs | |
| 11,316,230 B1 | 4/2022 | Boecker et al. | |
| 11,394,078 B1 | 7/2022 | Donovan et al. | |
| 11,691,709 B1 * | 7/2023 | Donovan | B60L 50/66 |
| | | | 188/377 |
| 2022/0393287 A1 * | 12/2022 | Donovan | H01M 10/425 |
| 2023/0080258 A1 | 3/2023 | Frank et al. | |
| 2023/0231245 A1 | 7/2023 | Gauthier | |
| 2023/0411767 A1 | 12/2023 | Wiegman et al. | |
| 2024/0079715 A1 * | 3/2024 | Wiegman | H01M 10/6566 |
| 2024/0128582 A1 * | 4/2024 | Wiegman | H01M 50/367 |

FOREIGN PATENT DOCUMENTS

| | | |
|---|---|---|
| CN | 217661181 U | 10/2022 |
| EP | 3985784 A1 | 4/2022 |

OTHER PUBLICATIONS

United Kingdom Combined Search and Examination report dated Jul. 30, 2024 for United Kingdom Application No. GB 2402828.4.
John A. DeRuntz, Jr. et al., "Crushing of a Tube Between Rigid Plates", Sep. 1, 1963, ASME J. Appl. Mech., 30, pp. 391-395).

* cited by examiner

*Primary Examiner* — Rodney A Bonnette
(74) *Attorney, Agent, or Firm* — EIP US LLP

(57) ABSTRACT

Described herein is an electric aircraft comprising a battery pack to power the aircraft. The battery pack comprises a housing, an arrangement of battery cells within the housing and a crumple structure associated with the battery pack. The crumple structure is beneath the arrangement of battery cells and is adapted to compress in the event of an impact from beneath the aircraft. A venting channel is fluidically coupled to the battery cells and arranged to vent gasses away from the battery cells. The venting channel passes through the crumple structure and is adapted to deform with the crumple structure in the event of an impact from beneath the aircraft.

20 Claims, 6 Drawing Sheets

Fig. 11a                                    Fig. 11b

ELECTRIC AIRCRAFT

CROSS-REFERENCE TO RELATED APPLICATIONS

This application claims priority to United Kingdom Application No. GB 2402828.4, filed Feb. 28, 2024, under 35 U.S.C. § 119(a). The above-referenced patent application is incorporated by reference in its entirety.

TECHNICAL FIELD

The present invention relates to an electric aircraft, a battery pack arrangement and a battery pack for an electric aircraft. The present invention is applicable in particular, but not exclusively, to electric vertical take-off and landing (eVTOL) aircraft.

BACKGROUND

As with all electric vehicles, a common performance indicator for an electric aircraft is the range of the aircraft—or, put another way: how far the aircraft can fly on a single charge cycle of its batteries. For any given architecture of aircraft, the range is determined by the charge capacity of the batteries and the mission weight of the aircraft, where the mission weight includes the weight of the aircraft, the pilot(s) and any cargo and/or passengers.

To maximise the range of an electric aircraft, it is desirable to minimise the unladen weight of the aircraft (i.e. the weight without cargo and/or passengers). Weight can, for example, be reduced by reducing the weight of the battery pack(s) or other structural elements of the aircraft, while still providing an aircraft with a sufficient power and level of safety according to safety regulations.

Safety regulations for all aircraft, for instance demanded by the European Union Aviation Safety Agency (EASA) or the United States Federal Aviation Administration (FAA), are naturally stringent. For example, regulations for electric aircraft demand that a battery pack must be able to withstand the shock from an impact event (e.g. an emergency landing) and avoid entering into a thermal runaway. It is, therefore, necessary to protect battery packs from such impact events.

Accordingly, there is a trade-off between providing adequate battery protection and reducing the weight of the aircraft to maximise range. It will be appreciated that battery protection is only one of many such safety-versus-weight trade-offs.

SUMMARY

According to a first aspect, the present invention provides an electric aircraft comprising: a battery pack to power the aircraft, the battery pack comprising a housing and an arrangement of battery cells within the housing; a crumple structure associated with the battery pack, the crumple structure beneath the arrangement of battery cells and adapted to compress in the event of an impact from beneath the aircraft; and a venting channel fluidically coupled to the battery cells and arranged to vent gasses away from the battery cells, wherein, the venting channel passes through the crumple structure and is adapted to deform with the crumple structure in the event of an impact from beneath the aircraft.

The venting channel is typically arranged to route gasses away from the battery pack in the event of a thermal runaway. The venting channel typically has a sufficient internal cross sectional area along its entire length to vent relatively high pressure gasses away from the battery cells without causing undue pressure and heat build-up near to other battery cells. This means that the venting channel may have a relatively large cross sectional area along its length, for example up to 50 mm or even greater, and so can take up significant space. Routing is therefore important to reduce space usage due to the venting channel, and a relatively simple routing (rather than a circuitous routing) can assist in avoiding gas pressure build up.

The crumple structure is adapted to absorb impact energy and reduce an impact and so protect the battery cells. The crumple structure aims to reduce the likelihood of thermal runaway in the event of an impact. The location of the venting channel, beneath (rather than, for instance, above) the arrangement of battery cells, and passing through the crumple structure, means that routing for the venting channel can be relatively simple and not take up unnecessary space. For instance, routing need not start above the battery pack, taking up space (for example, between the battery pack and a floor of the aircraft cabin) and need not to be channelled from above to below the battery pack for venting from the aircraft.

The housing may have an upper portion and a lower portion, the upper portion housing the arrangement of battery cells and the lower portion comprising a plenum, which forms a part of the venting channel.

Having a plenum below the arrangement of battery cells, rather than above, facilitates coupling of the battery pack to the rest of the venting channel below the battery pack. Routing for the venting channel can thereby be relatively simple.

The housing may comprise the crumple structure.

Accordingly, this may reduce the amount of additional crumple structure underneath the battery pack, which offers an opportunity to reduce the weight of the aircraft and/or the amount of space used for battery packs and crumple structures. In this case, a vertical height of the lower portion of the housing, and hence the venting channel, effectively reduces or compresses in the vertical direction in the event of an impact.

The housing may comprise top and bottom members (e.g. panels or plates) and sidewalls joining the top and bottom members, wherein the crumple structure comprises portions of the sidewalls that are adapted to compress, in a generally vertical direction, in the event of an impact beneath the aircraft.

For instance, portions of the sidewalls may have a structure, for example (without limitation) a zigzag, concertina, cellular or honeycomb structure, which is arranged to facilitate vertical compression. Various arrangements of structure will be apparent to those skilled in the art.

The sidewalls may have upper and lower portions, and the lower portions may then be adapted to compress, in a generally vertical direction, in the event of an impact from beneath the aircraft.

For example, the lower portions of the sidewalls may generally coincide with the lower portion of the battery pack. In other examples, other portions, for example upper portions, of the sidewalls may be adapted to compress. In such cases, although upper portions of the sidewalls forming a crumple structure may not, as such, be beneath the battery cells, the effect of such sidewalls compressing would move a base of the housing towards the arrangement of battery cells, and therefore the lower portion of the housing would still appear to be a compressed crumple zone. Similarly, in yet other examples, other portions of the sidewalls (e.g. mid-portions), or even entire sidewalls, may be adapted to compress.

The lower portion of the housing may contain one or more support members, extending between the arrangement of battery cells and a base of the housing, the support members may also be adapted to compress, in a generally vertical direction, in the event of an impact from beneath the aircraft.

For instance, the one or more support members may have (without limitation) a zigzag, concertina, cellular or honeycomb structure, which is susceptible to vertical compression. The one or more support members may be coupled to a support member beneath the arrangement of battery cells or pass between the arrangement of battery cells and couple to an upper internal portion of the housing.

The venting channel may comprise a portion inside the battery pack housing, a portion outside of the battery pack housing, and a valve member coupling the inside portion to the outside portion.

The valve member may seal the battery pack in normal operation and permit gases to escape if one or more battery cells vent gases. For example, the valve member may be a one-way valve or a burst valve. In either case, the valve may be arranged to permit gases to pass if the gas pressure inside the battery pack exceeds a specified pressure.

The crumple structure and a portion of the venting channel may be disposed beneath the battery pack.

The location of the venting channel, beneath the battery pack, may mean that the venting channel provides structural support for the battery pack in normal operation of the aircraft. This may reduce a need for additional structural support, and hence reduce the weight of the aircraft. In the event of an impact from beneath the aircraft, the venting channel may provide a structural element of the crumple structure, potentially reducing the need for additional crumple structure; and, again, reducing the weight of the aircraft.

The battery pack may comprise a plenum and a valve member for fluidically coupling the plenum to the venting channel.

As indicated, having a plenum below the arrangement of battery cells, rather than above, means that routing for the venting channel can be relatively simple.

The venting channel may comprise an elongate conduit, which is fluidically coupled to the inside of the battery pack and forms a part of the crumple structure.

The elongate conduit may and extend in a direction away from the battery pack and towards an extremity of the aircraft for external venting. The elongate conduit may have a portion that is generally parallel to a longitudinal (i.e. roll) axis of the aircraft or generally perpendicular to the longitudinal axis of the aircraft. In addition, or alternatively, the elongate conduit may be routed in a non-straight manner— for example, up/down, left/right, etc., to conform to the fuselage of the aircraft and/or route around other structural members. The elongate conduit may be surrounded by other crumple structures, having a similar form (e.g. a conduit form) or a different form (e.g. an aluminium honeycomb form).

The crumple structure may comprise an array of elongate conduits, at least one of which forms a part of the venting channel and is fluidically coupled to the inside of the battery pack.

The array of elongate conduits may comprise plural conduits arranged in a parallel arrangement. The arrangement may be close-packed or loosely packed. In the former instance, the array may have one or more than one layer of conduits.

The elongate conduit may comprise a tubular member having a generally circular cross section.

A tubular cross section of conduit offers a predictable strength and manner of deformation for given material and dimensional properties, meaning that a crumple structure comprising plural such tubular members can be designed to have a minimal weight to provide the necessary degree of energy absorption.

The venting channel may be arranged to provide at least one path, to at least one external vent of the aircraft, to vent gasses away from the battery cells and out of the aircraft.

The foregoing electric aircraft may comprise a plurality of battery packs, each comprising and/or coupled to a respective venting channel.

The electric aircraft may comprise a plurality of battery packs, each coupled to a common venting channel, which is disposed beneath at least one of the battery packs. In other examples, each battery pack may be coupled to an individual and/or independent venting channel.

The electric aircraft may comprise a cabin portion having a floor, and at least one battery pack and associated crumple structure disposed between the floor and underside of the aircraft.

The electric aircraft may be adapted for VTOL operation.

According to a second aspect, the present invention provides a battery pack for an electric aircraft, the battery pack comprising: a housing; an arrangement of battery cells disposed within the housing; and a venting channel comprising a plenum disposed within the housing, wherein the housing comprises a crumple structure adapted to compress a depth of the plenum in the event of an impact from beneath the battery pack.

The housing may have an upper portion and a lower portion, then the arrangement of battery cells may be disposed within the upper portion and the plenum may be disposed within the lower portion.

According to a third aspect, the present invention provides a battery pack arrangement for an electric aircraft, the battery pack arrangement comprising: a housing comprising an arrangement of battery cells; a venting channel beneath the housing; a valve member disposed in the housing and coupling the housing to the venting channel, for venting from the housing gases emanating from one or more battery cells; and a crumple structure beneath the housing, the crumple structure adapted to compress in the event of an impact from beneath the battery pack, wherein, the crumple structure comprises the venting channel, and wherein the venting channel is adapted to compress with the crumple structure in the event of an impact from beneath the battery pack.

BRIEF DESCRIPTION OF THE DRAWINGS

FIG. 1 is a schematic diagram of an eVTOL aircraft according to an example;

FIG. 2a is a schematic diagram illustrating a cross section of a side elevation through a fuselage of the eVTOL aircraft of FIG. 1;

FIG. 2b is a schematic diagram illustrating a cross section of a front elevation through section AA of the fuselage of the eVTOL aircraft of FIG. 2a;

FIG. 3 is a schematic diagram illustrating a housing of a battery pack according to an example;

FIGS. 11a, 11b and 11c are alternative crush structures according to examples.

DETAILED DESCRIPTION

Figures 1, 2A, 2B, 3:
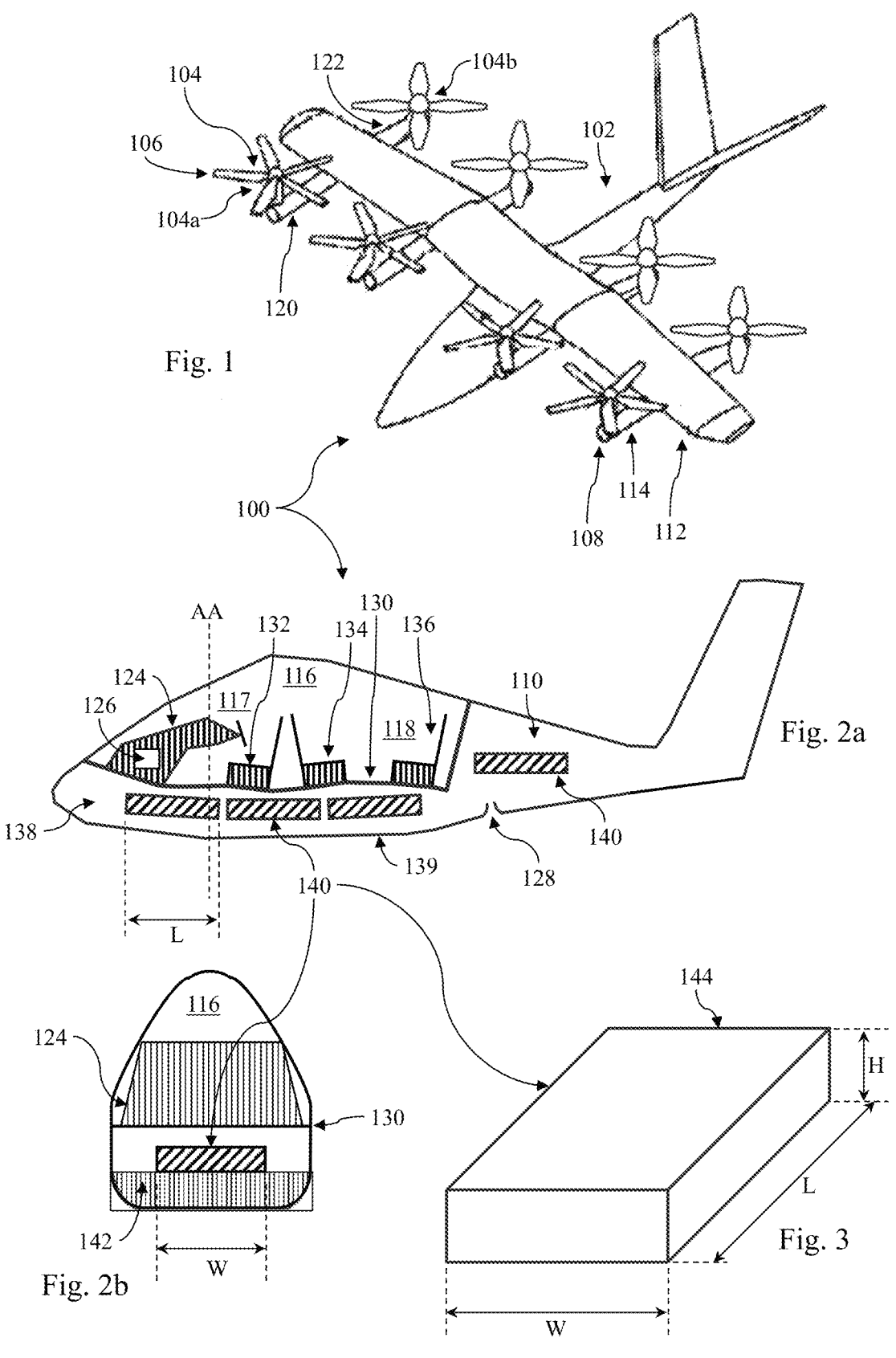

FIGS. 1, 2a and 2b show views of an eVTOL aircraft 100. The e VTOL aircraft 100 comprises an airframe 102, eight electric propulsion units (EPUs) 104, eight rotors 106, and four tilting mechanisms 108.

The airframe 102 comprises a fuselage 110, a pair of wings 112, and four pylons 114. The fuselage 110 houses a cabin portion 116 comprising a cockpit 117 for a pilot and a passenger area 118 for passengers. The pylons 114 each have a generally cylindrical shape. The length of each pylon 114 in a direction parallel to a roll axis of the eVTOL aircraft 100 is greater than a width of the wings 112 in the direction parallel to the roll axis.

The wings 112 are fixed to an upper side of the fuselage 110, approximately mid-way along the fuselage, and extend perpendicularly relative to the fuselage. The pylons 114 in the present example are fixed to undersides of the wings 112 and are spaced apart from one another along the wings in a direction parallel to a pitch axis of the eVTOL aircraft 100 such that there are two pylons 114 on either side of a left/right plane of the aircraft 100. A fore pylon portion 120 of each pylon 114 projects from the wings 112 on a fore side of the fore/aft plane and supports a fore EPU 104a and respective rotor. An aft pylon portion 122 of each pylon 114 projects from the wings 112 on an aft side of the fore/aft plane and supports an aft EPU 104b and respective rotor.

The fore EPUs 104a and rotors include the tilt mechanisms 108 (not shown in detail) and are tiltable between a forward thrust orientation, in which they are forwardly facing, and an upward thrust orientation, in which they are upwardly facing. FIG. 1 illustrates only the upwards thrust orientation. The aft EPUs 104b and rotors are fixed in an upwardly facing orientation and are used primarily during vertical take-off and landing (VTOL) manoeuvres.

Flight controls 124 are located within the cockpit 117 and enable a pilot of the eVTOL aircraft 100 to operate the aircraft, including inputting flight commands, such as to take off and land.

A flight control computer 126 receives the flight commands from the flight controls 124 and sends power commands to the EPUs 104 in order to operate the aircraft 100.

The fuselage 110 includes one or more battery vents 128, for example, through the side or base of the fuselage. The cabin portion 116 comprises a floor 130 and, mounted on the floor: a pilot seat 132, a rear-facing front passenger seat 134, and a front-facing rear passenger seat 136. The passenger seats are each wide enough to accommodate two or three people across the passenger area 118. Under the floor 130, in a sub-floor region 138 between the floor and a bottom or underside 139 of the fuselage 110 of the aircraft, are multiple battery packs 140 (three shown in this example), arranged lengthwise, end-to-end. A further battery pack 140 is shown disposed behind the cabin portion 116, between an upper side of the fuselage 110 and the underside 139. Other numbers and placements of battery packs are of course envisaged. For example, one or more battery packs may be located in available space within the fuselage 110, empennage or wings 112 of the aircraft. In any case, undersides of the battery packs may be protected by energy absorbing materials, for example in the form of an aluminium honeycomb structure 142, which act to protect the battery packs in the event of an impact. The energy absorbing materials may generally fill some or all of the space between an underside of a battery pack and a bottom of the fuselage 110. The battery packs 140 are firmly fixed or secured in battery pack compartments or regions with appropriate braces or fasteners (not shown).

The general format of the battery packs 140 is shown in FIG. 3. Each battery pack 140 has an external housing 144, which is generally cuboid in shape, with a length dimension L, a width dimension W and a height (or depth) dimension H.

Figures 4A, 4B, 4C, 5:
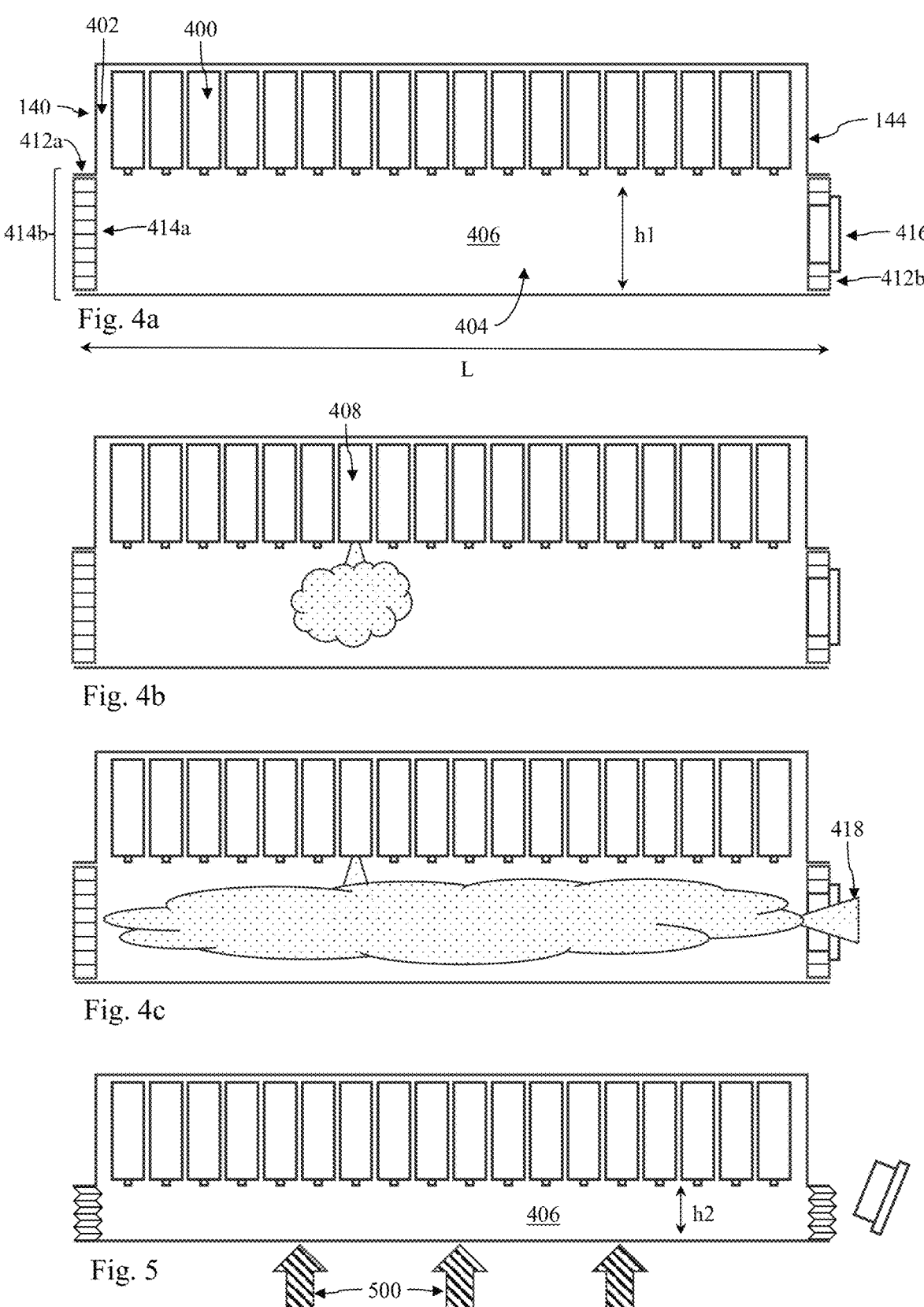
FIGS. 4a, 4b and 4c are schematic diagrams illustrating cross sections of a side elevation of a battery pack in a venting mode according to a first example.
FIG. 5 is a schematic diagram illustrating a cross sections of a side elevation of the first example of a battery pack in an impact mode according to a first example.

As illustrated in FIG. 4a, each battery pack 140 houses one or more battery cell arrays or modules comprising individual battery cells 400 in an upper portion 402 of the housing 144. The battery pack 140 of FIG. 4a is illustrated in cross section along the length L of the battery pack. While the battery cells 400 in this example are known cylindrical cells, other kinds of battery cells, such as prismatic or pouch cells, may be used. While FIG. 4a only illustrates a single lengthwise row of battery cells 400, in practice, there are multiple rows of battery cells arranged in a two-dimensional array across the width W and length L of the battery pack 140. In this example, only one vertical layer of battery cells 400 is provided. In other examples, there may be more than one layer of battery cells in an upper portion 402 of the housing 144; and, in that case, the battery cells and housing would be sized accordingly. Electrical and mechanical connections, between the battery cells and to the battery pack are not shown, for the sake of simplicity only. External connections to the battery pack 140 (and between battery packs) are not shown either.

Below the battery cells in a lower portion 404 of the housing 144 is a space, or plenum 406, into which gases that may be expelled from the battery cells 400 may flow and expand. The space or plenum 406 forms a part of a venting channel, which is adapted to carry or channel gases away from the battery cells 400 and to the battery vent 128, as will be described. An example of a battery cell 408 expelling gasses into the plenum 406, or venting channel, is illustrated in FIG. 4b. The plenum 406 has a height h1, which is about half the overall height H of the battery pack in this example.

Side walls (not shown in this sectional view) and end walls 412a and 412b of the lower portion 404 of the housing 144 are arranged to be rigid enough to support the battery pack in normal use and compressible in the event of a sufficiently large impact from below the battery pack 140 (an 'impact event'). There are many forms of compressible structure that are suitable for the side walls and end walls, as will be described hereinafter, which facilitate vertical compression, to absorb impact energy and assist in preventing a thermal runaway. In any event, the compression generally is in the vertical direction and, when there is compression, the depth of the plenum 406 is reduced, as will be described.

Configuring the side walls and end walls 412 to be rigid, but compressible in the event of a sufficiently large impact, provides a crush structure, or crumple structure 414a. The crumple structure 414a defines a crumple zone 414b under the arrangement of battery cells, where the crumple zone 414b is an integral part of the battery pack 140 and is formed by a crumple structure 414a comprising the side walls and end walls 412a and 412b. The plenum 406, and hence the respective portion of the venting channel, are within, and therefore pass through or are routed through, the crumple structure 414a and crumple zone 414b.

One end wall 412b of the battery pack housing 144 in this example houses a burst valve 416, which in normal use seals the plenum 406 from outside of the battery pack 140. As illustrated in FIG. 4c, the burst valve 416 is arranged to 'bust' in the event that a pressure buildup within the housing 144 creates a pressure differential between the plenum 406 and the outside of the battery pack 140 that exceeds a predetermined threshold, which is consistent with one or more battery cells 400 expelling gases and resulting in an increased pressure and/or temperature within the plenum 406. When a burst occurs, gases 418 are able to pass through the burst valve 416.

As illustrated in FIG. 5, in the event of an impact 500 from beneath the battery pack 140, the crumple structure 414a crumples, or compresses, to absorb the impact while minimally impacting the arrangement of battery cells 400. As a result, the plenum 406, and hence the venting channel within the battery pack, deforms, whereby the original height h1 of the plenum reduces to a reduced height h2. In examples, the reduced height h2 is at least half of the original height h1. However, in other examples, the reduced height h2 may be less than half of the original height h1.

As also illustrated in FIG. 5, the burst valve 416 is ejected from the end wall 412b to accommodate the crumpling. In other examples, the burst valve may itself be compressible or crushable, and may remain in-situ in the end wall during an impact event. In any case, an impact event may cause the plenum 406 to become disconnected from the rest of the venting channel. However, because the battery cells have been protected, thermal runaway is much less likely and the need for a fully connected venting channel is reduced.

Figures 6A, 6B, 6C, 7:
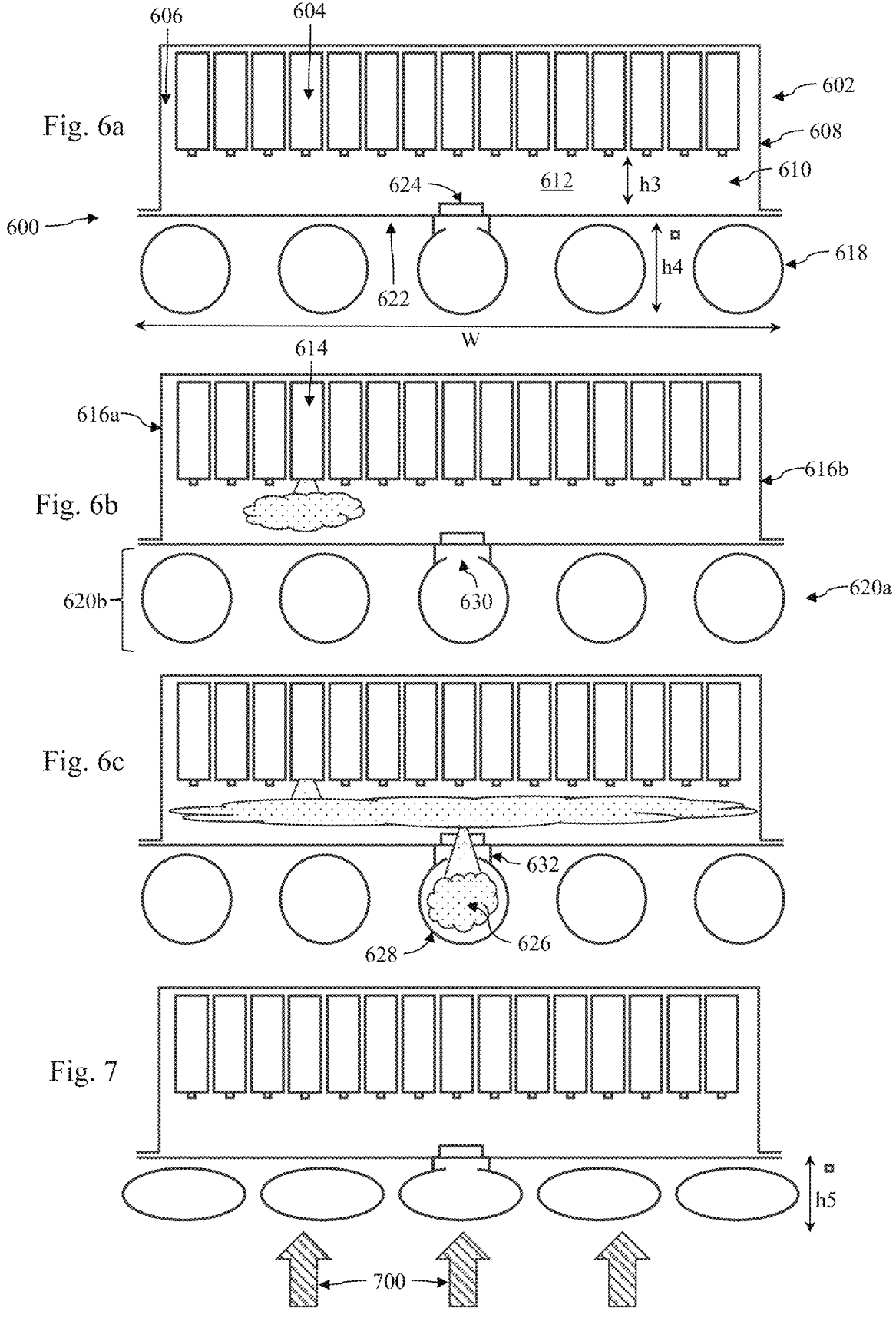
FIGS. 6a, 6b and 6c are schematic diagrams illustrating cross sections of a front elevation of a battery pack in a venting mode according to a second example.
FIG. 7 is a schematic diagram illustrating a cross sections of a front elevation of the second example of a battery pack in an impact mode according to a second example.

FIG. 6a illustrates an alternative battery pack arrangement 600, in which a battery pack 602 houses an array of battery cells 604 in an upper portion 606 of a battery pack housing 608. The battery cells 604 are arranged in a similar fashion to the battery cells 400 in the battery pack 140 of FIG. 4a. The battery pack 602 is illustrated in cross section across the width W of the battery pack. A lower portion 610 of the housing 608 contains a space or plenum 612 into which gases that may be expelled from the battery cells 604 may flow and expand. The space or plenum 612 forms a part of a venting channel, which is adapted to carry or channel gases expelled from the battery cells 604 to the battery vent 128, as will be described. An example of a battery cell 614 expelling gasses into the plenum 612 is illustrated in FIG. 6b. The plenum 612 has a height h3.

Side walls 616a and 616b and end walls (not shown in this sectional view) of the housing 608 are arranged to be rigid enough to support the battery pack in normal use and in the event of an impact from below the battery pack 602.

Underlying the battery pack 602 is an arrangement of pipes 618, or circular conduits, each spaced apart from and parallel to the other and running parallel to the length L dimension of the battery pack 602. The pipes 618 form a crumple structure 620a, under the arrangement of battery cells, and define a crumple zone 620b of the battery pack arrangement 600 under the arrangement of battery cells 604. The crumple structure 620a has a height h4.

A base 622 of the battery pack housing 604 houses a burst valve 624, which in normal use seals the plenum 612 from outside of the battery pack 602. As illustrated in FIG. 6c, the burst valve 624 is arranged to 'bust' in the event that a pressure build up within the housing 608 creates a pressure differential between the plenum 612 and the outside of the battery pack 602 that exceeds a predetermined threshold, which is consistent with one or more battery cells 614 expelling gases and resulting in an increased pressure within the plenum 612. When a burst occurs, gases 626 are able to pass through the burst valve 624.

The burst valve 624 in this example is approximately halfway across and halfway along the base 622 and is aligned with an inner or central one of the circular pipes 628. In other examples, a burst valve may be disposed in a side or end wall. Coincident with the location of the burst valve 624, the pipe 628 comprises an orifice 630, and a coupling 632 is disposed between the burst valve 624 and the orifice 630. The coupling provides a sealed route, such that gases expelled through the burst valve 624 enter into the pipe 628 and are channelled away from the burst valve 624 along the pipe, as illustrated in FIG. 6c. The pipe 628 is a part of the crumple structure 620a within the crumple zone 620b, and therefore forms a part of the venting channel. In other words, the pipe 628 is within and therefore passes through or is routed through the crumple structure 620a and crumple zone 620b. The pipe 628, along with the other pipes, is arranged to absorb energy during an impact event, thus helping to protect the respective battery pack above. The dual application of the pipe (as a conduit and a part of the crumple structure) assists in reducing an overall mass of the aircraft. The pipe 628 (along with the other pipes) absorbs energy by deforming as a part of the crumple structure 620a in the event of an impact event.

As illustrated in FIG. 7, in the event of an impact 700 from beneath the battery pack arrangement 600, the crumple structure 620a crumples to absorb the impact while minimally impacting the battery pack 602 and respective battery cells 604. As a result, the original height h4 of the crumple zone 620b reduces to a reduced height h5. In examples, the reduced height h5 is at least half of the original height h4. However, in other examples, the reduced height h5 may be less than half of the original height h4.

As can be seen, the spacing between the pipes 618 is sufficient to accommodate sideways expansion of the pipes—the circular cross sections of the pipes become elliptical, with a major axis of the ellipse being in the horizontal plane relative to the battery pack—in the event of an impact event that is sufficient to compress the crumple structure 620a.

As will be appreciated, the battery pack housing illustrated in FIGS. 6a-6c and 7 does not include an integral crumple structure of the kind illustrated in FIGS. 4a-4c and 5. Consequently, the height h3 of the plenum 612 does not need to be as high as the height h1 of the plenum in FIGS.

4a-4c and 5. In the limit, the size of the plenum 612 only has to be sufficient to enable gasses to be expelled from the battery cells and through the burst valve 624. In that sense, the battery cells may not need to be located in an upper portion of the battery pack housing 608. Instead, the battery cells may be located or distributed in any appropriate way within the battery pack housing, without a need to distinguish between upper or lower portions of the battery pack housing.

Figure 8A:
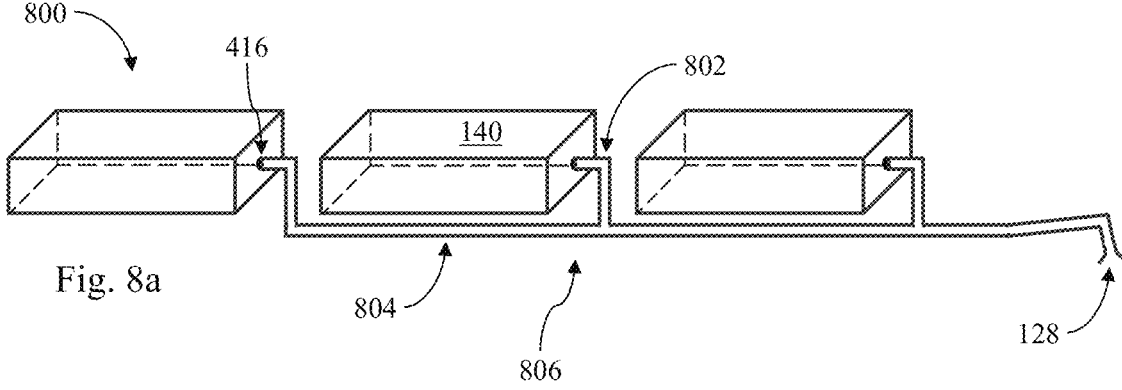
FIGS. 8a, 8b and 8c are each schematic diagrams of three battery packs fluidically coupled to a venting channel, respectively, according to three examples.

FIG. 8a illustrates an arrangement 800 of three battery packs 140, of the kind illustrated in FIG. 4a. The battery packs 140 are arranged, spaced apart end-to-end in the lengthwise direction. Each battery pack 140 is shown coupled through a side wall to a conduit 802, via a respective burst valve 416. The conduit 802 extends to below the respective battery pack 140 and couples to a main or common conduit 804, which in turn is coupled to the battery vent 128. In this example, the main conduit 804 is disposed below the battery pack 142 and below the crumple zone 414a that is illustrated in FIG. 4a.

The conduits 802 and main conduit 804 form a part of the venting channel 806, which is arranged to carry gases expelled from one or more battery cells (of one or more battery packs 140) to the battery vent 128.

Figure 8B:
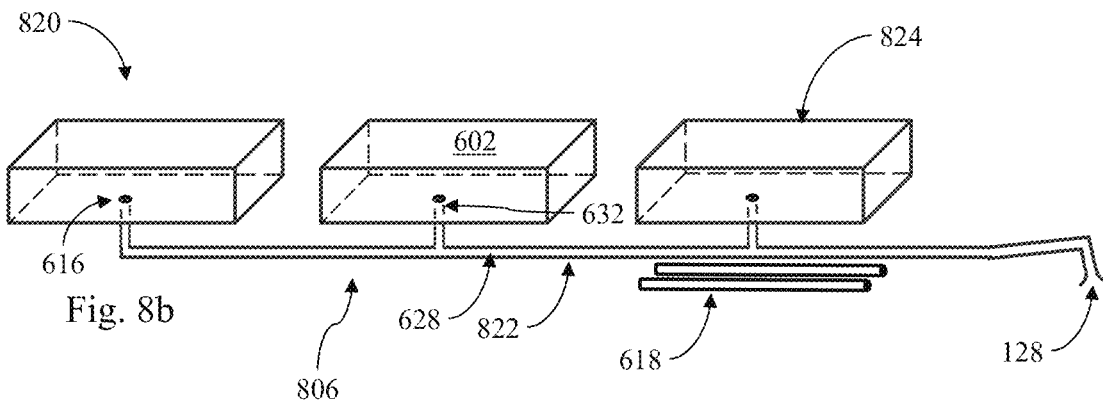

FIG. 8b illustrates an arrangement 820 of three battery packs 602, of the kind illustrated in FIG. 6a. The battery packs 140 are arranged, spaced apart end-to-end in the lengthwise direction. Each battery pack 602 is shown coupled through its base, via a respective coupling 632, to a main or common conduit 822, comprising each of the respective pipes 628, which in turn is coupled to the battery vent 128. In this example, the main conduit 822 and respective pipes 628 are disposed below the battery packs 602 and within the crumple zone 620b that is illustrated in FIG. 6a.

To aid understanding, the main conduit 822 is shown spaced apart from the underside of the battery packs 602, whereas in practice it would be close to or even rest against the underside of the battery packs, as is more accurately illustrated in FIG. 6a. In addition, the central pipes 628 that form the main conduit 822 may each extend beyond the length L of the respective battery pack 602 so that they can be coupled together under and between each battery pack. Alternatively, there may be only one pipe 628 that is dimensioned to be long enough to reside under all three battery packs. Also shown in FIG. 8b, under one battery pack 824, are pipes 618 that form the rest of the crumple structure 620a under the respective battery pack. Other pipes that would be present are not shown so as not to obscure other features. In practice, however, similar pipes reside under each battery pack, on both sides of the respective central pipe 628, as illustrated in FIG. 6a, in order to form the respective crumple structure and crumple zone 620b. Instead, one or more of the pipes 618 may be dimensioned to be long enough to extend beneath, and provide a crumple structure for, all three of the battery packs.

The conduits 628 and main conduit 822, in any of the foregoing lengths and configurations, form a part of the venting channel 806, which is arranged to carry gases expelled from one or more battery cells 604 (of one or more battery packs 602) to the battery vent 128.

Figure 8C:
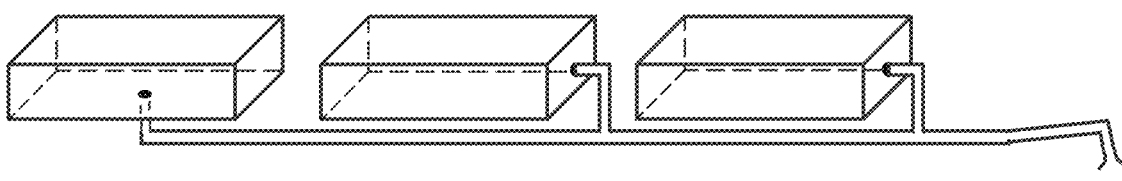

FIG. 8c illustrates an arrangement 840 of three battery packs, wherein a first battery pack is coupled to a venting channel through its base (similar to FIG. 6b) and the second two battery packs are coupled to the venting channel through the sides (similar to FIG. 6a). Different arrangements and combinations of battery packs and venting channel connections are envisaged. In any event, the battery packs may incorporate integral crumple structures or there may be a crumple structure beneath the respective battery pack(s). In some examples, a battery pack arrangement has an integral crumple structure (e.g. 414a) and an underlying crumple structure (e.g. 620a), whereby a respective crumple zone spans the depth of the integral crumple structure and the underlying crumple structure. In such cases, the venting channel is within the respective battery packs and extends also below the respective battery packs.

Figure 9A:
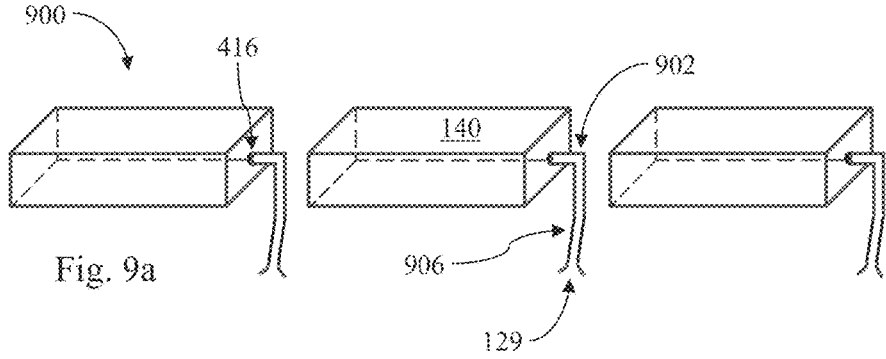
FIGS. 9a and 9b are each schematic diagrams of three battery packs fluidically coupled to independent venting channels, according to examples.

FIG. 9a illustrates an alternative arrangement 900 of three battery packs 140, of the kind illustrated in FIG. 4a. The battery packs 140 are arranged, spaced apart end-to-end in the lengthwise direction. Each battery pack 140 is shown coupled to a conduit 902, via a respective burst valve 416. The conduit 902 extends to below the respective battery pack 140, and couples to a battery vent 129 disposed in the base of the aircraft, to enable gasses venting from the battery pack to be routed outside of the aircraft. The arrangement in FIG. 9a differs from that in FIG. 8a insofar as each battery pack in FIG. 9a has its own conduit 902 terminating at a respective, separate battery vent 129. Separation of the conduits and battery vents in this way reduces the likelihood of cross-contamination of gasses from a battery pack that is in a thermal runaway state to any of the other battery packs. In other examples, the routing of the conduits 902 to the respective battery vents 129 may be in any convenient direction and location, for example, venting out of the front, rear, underside, side or topside of the fuselage.

In any event, each conduit 902 forms a part of a venting channel 806 of the respective battery pack, where the venting channel 906 is arranged to carry gases expelled from the battery cells of the battery pack 140 to the respective battery vent 129.

Figure 9B:
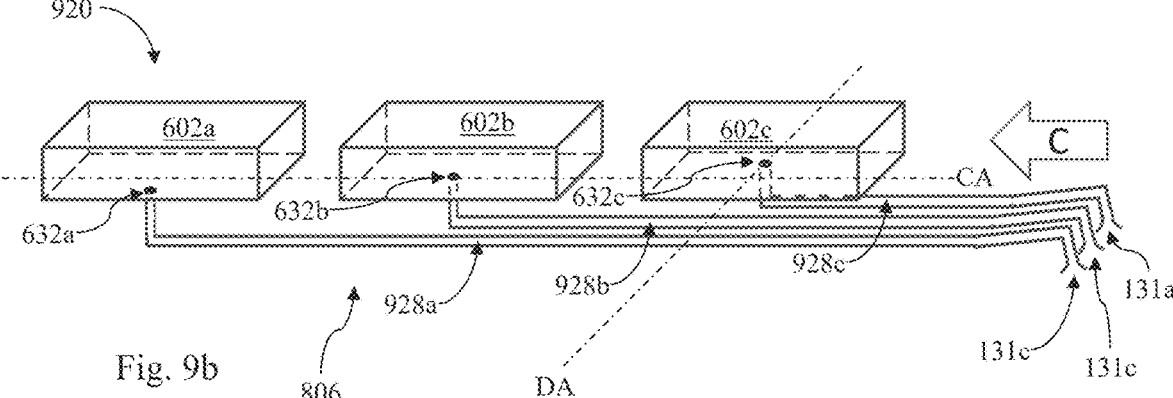
Figure 9C:
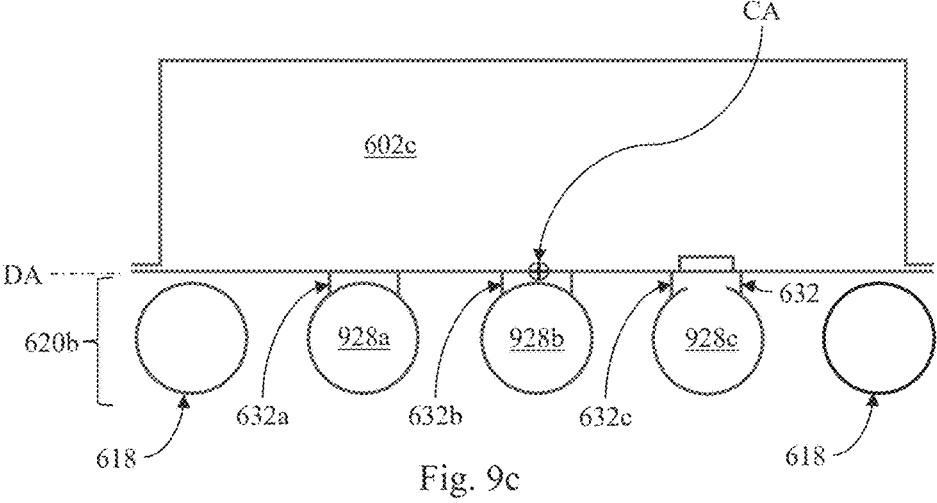
FIG. 9c is a schematic diagram of a section through FIG. 9b.

FIGS. 9b and 9c illustrate an alternative arrangement 920 of three battery packs 602, of the kind illustrated in FIG. 6a. The battery packs 140 are arranged, spaced apart end-to-end in the lengthwise direction, and have a central longitudinal axis CA running through a width centreline of each of the battery packs. FIG. 9c is a sectional view along the central longitudinal axis CA of FIG. 9b, viewed from the right hand side (i.e. direction C) and at an axis DA, which is perpendicular to the central longitudinal axis CA. Each battery pack 602 is shown coupled, via its respective coupling 632, to a respective, individual battery vent 131 via an individual longitudinal conduit 928. As in FIG. 9a, separation of the conduits 922 and battery vents 131 in this way reduces the likelihood of cross-contamination of gasses from a battery pack that is in a thermal runaway state to any of the other battery packs. In this example, the longitudinal conduits 928 are disposed below the battery packs 602 and within the crumple zone 620b that is illustrated in FIG. 6a.

As shown, the couplings 632 for each of the battery packs are offset from one another perpendicular to the central longitudinal axis CA. More specifically, the coupling 632a for the left-most battery pack 602a in FIG. 9b is on the near side of the central longitudinal axis CA, the coupling 632b for the middle battery pack 602b is aligned with the central longitudinal axis CA, and the coupling 632c for the right-most battery pack 602c is on the far side of the central longitudinal axis CA. Correspondingly, the longitudinal conduits 928, to which each of the respective conduits 902 are coupled, are offset from and parallel to the central longitudinal axis CA. Axis DA passes through the coupling 632c of the right most battery pack 602c.

Similarly to FIG. 8b, the longitudinal conduits 928 are shown spaced apart from the undersides of the battery packs 602, whereas in practice the longitudinal conduits 928 would be close to or even rest against the undersides of the battery packs, as is more accurately illustrated in FIG. 6a.

As best shown in FIG. 9c, each of the longitudinal conduits 928, individually, forms a part of the crumple structure 620b. Additional pipes 618 are included as necessary to complete the crumple structure 620b across the width of each of the battery packs 602.

The longitudinal conduit 928 for each battery pack, in any of the foregoing lengths and configurations, forms a part of the venting channel 806 of the respective battery pack, and is arranged to carry gases expelled from one or more battery cells 604 of the respective battery pack 602 to the respective battery vent 131.

Figure 10:
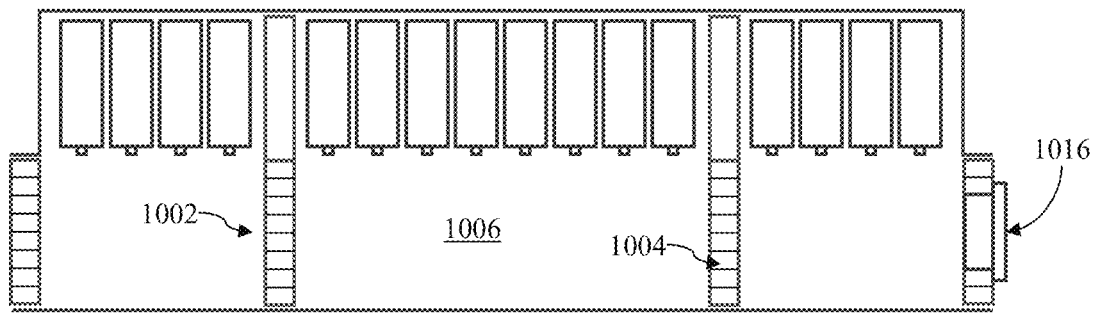
FIG. 10 is a schematic diagram illustrating a cross sections of a side elevation of a battery pack including support members within the battery pack.

FIG. 10 illustrates a battery pack 1006 of the kind illustrated in FIG. 4a. In this example, however, the battery pack 1006 includes internal supports 1002, which connect top and bottom sides or panels of the battery pack and provide support in addition to the outer (i.e. front, back and side) walls. The internal supports 1002 include a crumple structure 1004, which is arranged to crumple in the event of an impact from beneath the battery pack 1006. The crumple structure 1004 is arranged to have a resistance to crumpling which is the same as or similar to the resistance to crumpling of the outer walls. The internal supports 1002 may take the form of pillars or elongate walls, which extend part of the way or all of the way between the external walls. In the latter case, the walls have recesses (not shown) to ensure that any gases that are expelled from a battery cell can pass, unhindered, through a plenum and out of a burst valve 1016 of the battery pack.

The top and bottom panels and sidewalls of any of the foregoing battery packs may be formed from a metal such as aluminium or from known composite materials or structures. The crumple structures and any internal supports may also be formed from a metal such as aluminium or from known composite materials or structures.

Figure 11C:
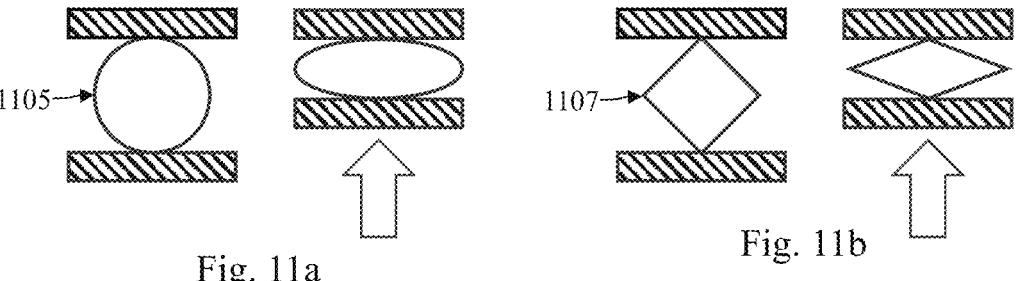
Figure 11C:
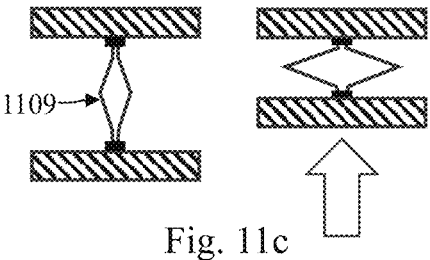

FIG. 11a illustrates an illustrative crush structure comprising a circular cross section pipe 1105 between upper and lower surfaces, which, when subjected to a force from below, deforms into an oval cross section. This is the basis for certain of the crush structures in the foregoing examples. FIG. 11b illustrates an alternative crush structure comprising a square pipe 1107, where the pipe is orientated so that opposing corners are in contact with upper and lower surfaces, to facilitate compression. When subjected to a force from below, the square pipe deforms to a generally diamond-shaped cross section, with a major dimension parallel with the upper and lower surfaces and a minor dimension perpendicular to the upper and lower surfaces. FIG. 11c illustrates a further alternative crush structure, which is fabricated from two opposing plates, which are secured together (e.g. using fasteners or welding) at their tops and bottoms and slightly splayed nearer to their mid-sections, to facilitate compression. When subjected to a force from below, the effect is similar to the square pipe example in FIG. 11b: the mid-sections of the plates move further away from one another to form a generally diamond-shaped cross section 1109, with a major dimension parallel with the upper and lower surfaces and a minor dimension perpendicular to the upper and lower surfaces. Other structures are contemplated, which provide support and are amenable to compression. Examples herein may adopt one kind of structure or a mix of different structures. Materials suitable for the crush structures include mild steel, aluminium, alloys or any other material or composite that performs to the required standards and/or requirements. Circular cross section crush structures are particularly convenient because the compression mechanism and forces that can be withstood are well understood, for example as set out in work such as: "Crushing of a Tube Between Rigid Plates" (DeRuntz, Jr., John A., and Hodge, Jr., P. G., 1963, ASME J. Appl. Mech., 30, pp. 391-395).

Other examples of the invention include any appropriate and/or logical combination of features from any of the foregoing examples. In yet other examples, the plenum within the battery pack may be above the arrangement of battery cells, or there may be a plenum above and below the arrangement of battery cells. In addition, or alternatively, the arrangement of battery cells may be spaced from the top and bottom of the battery pack. In any of these alternatives, the crumple structure still reduces forces exerted on the battery cells and reduces the chance of thermal runaway. In examples described, the crush structure underneath a battery pack may comprise circular pipes. Other cross sections of pipes may be utilized.

What is claimed is:

1. An electric aircraft comprising:
   a battery pack to power the aircraft, the battery pack comprising a housing and an arrangement of battery cells within the housing;
   a crumple structure associated with the battery pack, the crumple structure beneath the arrangement of battery cells and adapted to compress in the event of an impact from beneath the aircraft; and
   a venting channel fluidically coupled to the battery cells and arranged to vent gasses away from the battery cells,
   wherein, the venting channel passes through the crumple structure and is adapted to deform with the crumple structure in the event of an impact from beneath the aircraft.

2. An electric aircraft according to claim 1, wherein the housing has an upper portion and a lower portion, the upper portion housing the arrangement of battery cells and the lower portion comprising a plenum, which forms a part of the venting channel.

3. An electric aircraft according to claim 2, wherein the housing comprises the crumple structure.

4. An electric aircraft according to claim 3, wherein the housing comprises top and bottom members and sidewalls joining the top and bottom members, wherein the crumple structure comprises portions of the sidewalls that are adapted to compress, in a generally vertical direction, in the event of an impact beneath the aircraft.

5. An electric aircraft according to claim 4, wherein the sidewalls have upper and lower portions, and the lower portions are adapted to compress, in a generally vertical direction, in the event of an impact from beneath the aircraft.

6. An electric aircraft according to claim 2, wherein the lower portion of the housing contains one or more support members, extending between the arrangement of battery cells and a base of the housing, the support members adapted to compress, in a generally vertical direction, in the event of an impact from beneath the aircraft.

7. An electric aircraft according to claim 2, wherein the venting channel comprises a portion inside the battery pack housing, a portion outside of the battery pack housing, and a valve member coupling the inside portion to the outside portion.

8. An electric aircraft according to claim 1, wherein the crumple structure and a portion of the venting channel are disposed beneath the battery pack.

9. An electric aircraft according to claim 8, wherein the battery pack comprises a plenum and a valve member for fluidically coupling the plenum to the venting channel.

10. An electric aircraft according to claim 8, wherein the venting channel comprises an elongate conduit, which is fluidically coupled to the inside of the battery pack and forms a part of the crumple structure.

11. An electric aircraft according to claim 10, wherein the crumple structure comprises an array of elongate conduits, at least one of which forms a part of the venting channel and is fluidically coupled to the inside of the battery pack.

12. An electric aircraft according to claim 10, wherein the elongate conduit comprises a tubular member having a generally circular cross section.

13. An electric aircraft according to claim 1, wherein the venting channel is arranged to provide at least one path, to at least one external vent of the aircraft, to vent gasses away from the battery cells and out of the aircraft.

14. An electric aircraft according to claim 1, comprising a plurality of battery packs, each comprising and/or coupled to a respective venting channel.

15. An electric aircraft according to claim 1, comprising a plurality of battery packs, each coupled to a common venting channel, which is disposed beneath at least one of the battery packs.

16. An electric aircraft according to claim 1, comprising a cabin portion having a floor, and at least one battery pack and associated crumple structure disposed between the floor and underside of the aircraft.

17. An electric aircraft according to claim 1 adapted for VTOL operation.

18. A battery pack for an electric aircraft, the battery pack comprising:
 a housing;
 an arrangement of battery cells disposed within the housing; and
 a venting channel comprising a plenum disposed within the housing,
 wherein the housing comprises a crumple structure adapted to compress a depth of the plenum in the event of an impact from beneath the battery pack.

19. A battery pack according to claim 18, wherein the housing has an upper portion and a lower portion, the arrangement of battery cells is disposed within the upper portion and the plenum is disposed within the lower portion.

20. A battery pack arrangement for an electric aircraft, the battery pack arrangement comprising:
 a housing comprising an arrangement of battery cells;
 a venting channel beneath the housing;
 a valve member disposed in the housing and coupling the housing to the venting channel, for venting from the housing gases emanating from one or more battery cells; and
 a crumple structure beneath the housing, the crumple structure adapted to compress in the event of an impact from beneath the battery pack,
 wherein, the crumple structure comprises the venting channel, and wherein the venting channel is adapted to compress with the crumple structure in the event of an impact from beneath the battery pack.

\* \* \* \* \*